(12) United States Patent
Ismail et al.

(10) Patent No.: US 10,723,957 B1
(45) Date of Patent: Jul. 28, 2020

(54) PROTIC ASPHALTENE IONIC LIQUIDS AS ASPHALTENE STABILIZER

(71) Applicant: King Abdulaziz University, Jeddah (SA)

(72) Inventors: Ali Issa Ismail, Jeddah (SA); Ayman Mohamady Atta, Riyadh (SA); Mohamed Hassan El-Newehy, Riyadh (SA); Mohamed Elsayed El-Hefnawy, Jeddah (SA)

(73) Assignee: King Abulaziz University, Jeddah (SA)

( * ) Notice: Subject to any disclaimer, the term of this patent is extended or adjusted under 35 U.S.C. 154(b) by 0 days.

(21) Appl. No.: 16/850,356

(22) Filed: Apr. 16, 2020

Related U.S. Application Data

(62) Division of application No. 16/653,467, filed on Oct. 15, 2019.

(51) Int. Cl.
*C10G 21/20* (2006.01)
*C10G 21/00* (2006.01)
*C09K 8/524* (2006.01)

(52) U.S. Cl.
CPC .......... *C10G 21/003* (2013.01); *C09K 8/524* (2013.01); *C10G 21/20* (2013.01); *C10G 2300/206* (2013.01); *C10G 2300/80* (2013.01)

(58) Field of Classification Search
CPC .............. C10G 21/003; C10G 21/20; C10G 2300/206; C10G 2300/80; C09K 8/524
See application file for complete search history.

(56) References Cited

U.S. PATENT DOCUMENTS

| | | | | |
|---|---|---|---|---|
| 2007/0284283 | A1* | 12/2007 | Duyvesteyn | C10C 3/04 208/4 |
| 2010/0147742 | A1* | 6/2010 | Ozum | C10G 1/04 208/44 |
| 2012/0055843 | A1* | 3/2012 | Bourane | C10G 25/003 208/45 |
| 2016/0060550 | A1* | 3/2016 | Francisco | C10G 55/06 208/7 |
| 2017/0190990 | A1* | 7/2017 | Koseoglu | C10G 27/12 |
| 2018/0079976 | A1* | 3/2018 | Tort | C08L 61/34 |

* cited by examiner

*Primary Examiner* — Ellen M McAvoy
(74) *Attorney, Agent, or Firm* — W&C IP

(57) ABSTRACT

Protic asphaltene ionic liquids comprising chemically modified asphaltenes are provided. The asphaltenes are modified via carboxylation and formation of alkyl and/or aryl imidazole derivatives. Chemical modification of the asphaltenes results in their stabilization e.g. in heavy petroleum crude, and prevents their aggregation and precipitation.

19 Claims, 13 Drawing Sheets

PROTIC ASPHALTENE IONIC LIQUIDS AS ASPHALTENE STABILIZER

FIELD OF THE INVENTION

The invention is generally related to methods to produce protic asphaltene ionic liquids as asphaltene stabilizers for heavy petroleum crude to prevent aggregation and precipitation of asphaltenes. In particular, the invention provides methods of forming the protic asphaltene ionic liquids by modifying the chemical structures of asphaltenes.

BACKGROUND OF THE INVENTION

Asphaltenes are one of the most important components of the petroleum heavy crude oil that control its rheology due to their polarity, complexity of their amorphous structures, solubility in aromatic solvent, precipitation into n-alkane and their molecular weight variations. Their chemical structure and elemental composition depend on their origin, source rocks, and thermal history [1]. Their polarity is attributed to presence of heteroatoms included nitrogen, oxygen and sulfur and traces of metals, such as nickel, vanadium and iron. Asphaltenes produced as one of the bitumen (asphalt) components and may aggregate and precipitate during the downstream and upstream processes in the pipelines or storage tanks to cause many serious problems in production, refining and transportation. The chemical structure of asphaltenes are modified through substitution reactions on the polycondensed aromatic rings, and heterocyclic [2-4]. Moreover, the long alkyl chains, functional groups such as COOH, OH, NH, SH, etc., and conjugated dienes represent other functional groups on the asphaltene molecules can be also modified in a substitution, elimination, or addition reactions [2-4].

To minimize the harmful effects of asphaltenes it is important to better understand their structural characteristics that assist in increasing their interaction with resin to form big micelles and lower interaction with resin to form aggregates which are still a matter of dispute. The asphaltenes precipitation and aggregation were affected by variation of temperature and pressure of the reservoir [5]. The chemical inhibitors are more favored than thermal and mechanical methods to stabilize and disperse the asphaltenes to keep them suspended by stabilization mechanisms [6]. Recently, protic ionic liquids (PILs) as green solvents having low melting point, non-flammability, and higher thermal stability were used as asphaltene dispersants and for asphaltene solvent extraction from asphalt and coal [7-10].

The chemical structures of asphaltenes have been modified to produce valuable crude oil added materials via modification with sulfuric acid [11], blending with flow improver polymers to modify the rheology of crude oil [12], solubilizing in the hydrocarbon mixtures [13], blending with asphaltene dispersant polymers [14]. The asphaltenes were mixed to produce polymer composites [15] and also modified to produce surfactants through reacting with anhydride or halides [16]. Sulfonated asphaltenes were used to prepare hydrophobic magnetite to act as petroleum crude oil collector by an external magnetic field [17].

There is a need in the art for agents that prevent or reduce asphaltene aggregation and/or precipitation in order to prevent or lessen the problems that otherwise occur during production, storage, transportation and/or refining of a petroleum hydrocarbon fluid.

SUMMARY OF THE INVENTION

Aspects of the invention provide protic asphaltene ionic liquids, methods of making the protic asphaltene ionic liquids (IL), and methods of using the protic asphaltene ionic liquids to prevent or inhibit asphaltene aggregation and/or precipitation in e.g. a petroleum-based fluid such as crude oil. Inhibition of asphaltene aggregation and/or precipitation prevents or lessens the problems that otherwise occur during production, storage, transportation or refining of petroleum hydrocarbon fluids.

In some embodiments, the protic asphaltene ionic liquids are produced by reacting oxidized alkyl chains of the asphaltenes with alkyl amines and with hydroxyl alkanal and/or hydroxy benzolaldehydes in the presence of polyaldehydes. In further embodiments, the protic asphaltene ionic liquid is advantageously soluble in water and in organic solvents.

In some embodiments, the protic asphaltene ionic liquids are thermal stable up to 300° C.

In other embodiments, the protic asphaltene ionic liquids comprise one are more organic salts wherein the anions of the organic salts are carboxylates, carbonates, alkyl carbonates, halides, hydroxyl, bicarbonates, alkoxides, hydroycarbanates, or a combination thereof.

In a particular embodiment, the protic asphaltene ionic liquids comprise one are more organic salts wherein the cations have the formula:

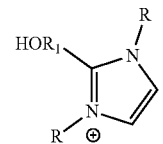

wherein R and R1 are independently selected from hydrogen, a straight or branched C1-30 alkyl group, benzyl, a C7-30 alkylbenzyl group, a C7-30 aryl alkyl group, a straight or branched C3-30 alkenyl group, a C1-30 hydroxyalkyl group, a C7-30 hydroxyalkylbenzyl group, an oxyalkylene or a polyoxyalkylene group or a zwitterion.

DETAILED DESCRIPTION

Figure 1A:
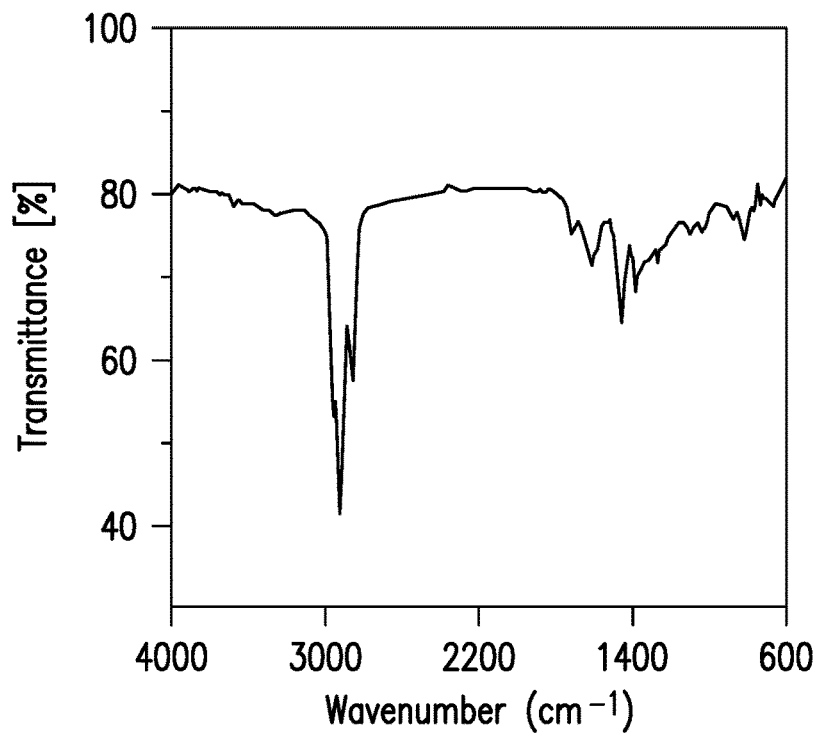
FIG. 1A-E. FTIR spectra of (A), asphaltenes, (B), asphaltene carboxylic acid prepared in example 1, (C), asphaltene carboxylic acid prepared in example 2, (D), protic asphaltenes ionic liquids prepared in example 3 and (E), protic asphaltenes ionic liquids prepared in example 4.
Figure 1B:
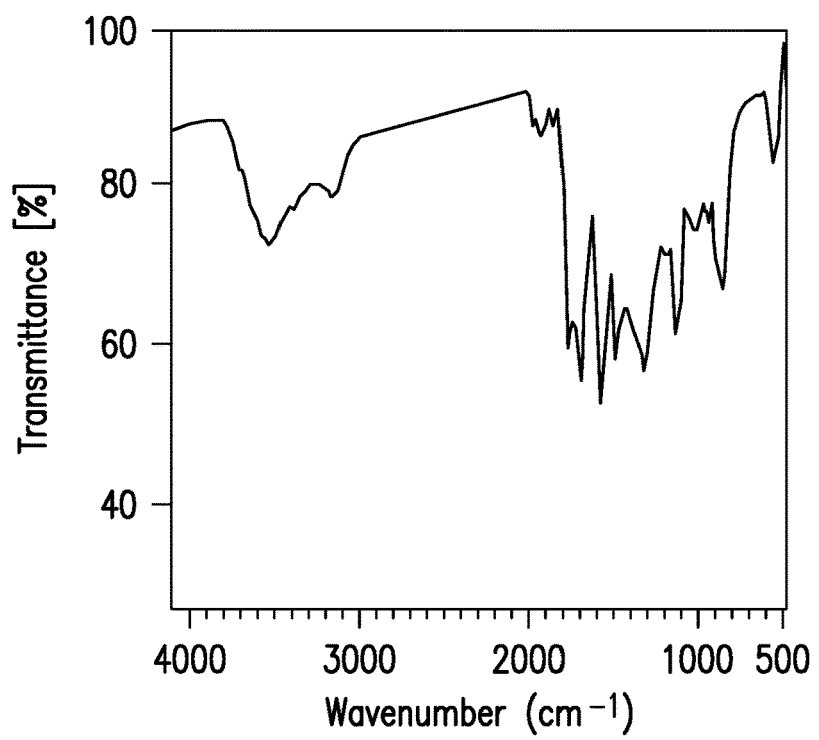

The following description and examples illustrate some exemplary embodiments of the disclosed invention in detail.

Those of skill in the art will recognize that there are numerous variations and modifications of this invention that are encompassed by its scope. Accordingly, the description of exemplary embodiments should not be deemed to limit the scope of the present invention.

As used herein, any "R" group(s) such as, without limitation, R, Ra and so on represent substituents that can be attached to the indicated atom. An R group may be substituted or unsubstituted. If two "R" groups are described as being "taken together" the R groups and the atoms they are attached to can form a cycloalkyl, aryl, heteroaryl, or heterocycle.

As used herein, "alkyl" refers to a straight or branched hydrocarbon chain that includes a fully saturated (no double or triple bonds) hydrocarbon group. The alkyl group may have 1 to 30 carbon atoms (whenever it appears herein, a numerical range such as "1 to 30" refers to each integer in the given range; e.g., "1 to 30 carbon atoms" means that the alkyl group may consist of 1 carbon atom, 2 carbon atoms, 3 carbon atoms, etc., up to and including 30 carbon atoms, although the present definition also covers the occurrence of the term "alkyl" where no numerical range is designated). The alkyl group may also be a medium size alkyl having 1 to 10 carbon atoms. The alkyl group could also be a lower alkyl having 1 to 6 carbon atoms. The alkyl group of the compounds may be designated as "$C_1$-$C_4$ alkyl" or similar designations. By way of example only, "$C_1$-$C_4$ alkyl" indicates that there are one to four carbon atoms in the alkyl chain, i.e., the alkyl chain is selected from methyl, ethyl, propyl, iso-propyl, n-butyl, iso-butyl, sec-butyl, and t-butyl. Typical alkyl groups include, but are in no way limited to, methyl, ethyl, propyl, isopropyl, butyl, isobutyl, tertiary butyl, pentyl and hexyl. The alkyl group may be substituted or unsubstituted.

As used herein, "alkenyl" refers to an alkyl group that contains in the straight or branched hydrocarbon chain one or more double bonds. An alkenyl group may be unsubstituted or substituted.

As used herein, "aryl" refers to a carbocyclic (all carbon) monocyclic or multicyclic aromatic ring system (including fused ring systems where two carbocyclic rings share a chemical bond) that has a fully delocalized pi-electron system throughout all the rings. The number of carbon atoms in an aryl group can vary. For example, the aryl group can be a $C_6$-$C_{14}$ aryl group, a $C_6$-$C_{10}$ aryl group, or a $C_6$ aryl group. Examples of aryl groups include, but are not limited to, benzene, naphthalene and azulene. An aryl group may be substituted or unsubstituted.

As used herein, "petroleum hydrocarbon fluid" refers to, for example, crude oil, shale oil, shale gas condensate, bitumen, diluted bitumen, refinery fractions including distillates including coker distillates, alkylates, finished fuel including diesel fuel, petroleum fuel and biofuel, finished petroleum products, reformates, cycle oil, residual oil, fuel gas, flare gas, propane, butane, liquefied petroleum gas, natural gas condensate, natural gas liquid and combinations thereof. The asphaltene inhibitor compositions described herein are especially useful with crude oil, bitumen, diesel fuel, petroleum fuel, biofuel, residual oil, fuel gas, flare gas, propane, butane, liquefied petroleum gas (LPG), natural gas liquid (NGL) and refinery fractions (including gas oils and light lubricating oils) and combinations thereof. In addition, any of these may contain water, brines, gases such as hydrocarbon gases, or a combination thereof.

As used herein, "asphaltene carboxylic acid" refers to alkyl chains of asphaltenes which have been oxidized to carboxylic acid in the presence of an oxidizing agent.

As used herein, "asphaltene carboxylate" refers to deprotonated asphaltene carboxylic acids.

In one embodiment, the protic asphaltene ionic liquids described herein are or comprise organic salts formed from asphaltenes isolated from coal, bitumen, sludge, crude oil, diesel fuel, petroleum fuel, biofuel, residual oil, fuel gas, flare gas, propane, butane, liquefied petroleum gas, natural gas liquid, or refinery fractions (including gas oils and light lubricating oils) and combinations thereof.

In one embodiment, the protic asphaltene ionic liquid is an organic salt comprising:
1) an anion such as but not limited to a carboxylate, carbonate, alkyl carbonate, halide, hydroxyl, bicarbonate, alkoxide, hydroxycarbonate or a combination thereof, and/or
2) a cation such as but not limited to imidazolium, pyridinium, pyrrolidinium, phosphonium, sulfonium, ammonium or a combination thereof.

In a preferred embodiment, the protic asphaltene ionic liquid is or comprises an organic salt comprising:
1) an asphaltene carboxylate, and
2) 1,3-dialkyl imidazolium of formula:

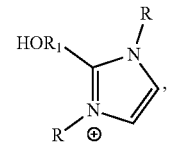

wherein R and R1 are independently selected from hydrogen, a straight or branched C1-30 alkyl group, benzyl, a C7-30 alkylbenzyl group, a C7-30 aryl alkyl group, a straight or branched C3-30 alkenyl group, a C1-30 hydroxyalkyl group, a C7-30 hydroxyalkylbenzyl group, an oxyalkylene or a polyoxyalkylene group or a zwitterion.

In one aspect, a protic asphaltene ionic liquid according to the present invention is prepared according to a method comprising the following steps:
1) extracting asphaltenes from coal, bitumen, sludge, crude oil, diesel fuel, petroleum fuel, biofuel, residual oil, fuel gas, flare gas, propane, butane, liquefied petroleum gas, natural gas liquid, or refinery fractions (including gas oils and light lubricating oils) and combinations thereof; preferably from crude oil,
2) oxidizing the asphaltenes in the presence of a suitable oxidizing agent, to form an asphaltene carboxylic acid,
3) dissolving the asphaltene carboxylic acid and a solution of alkyl amine in a suitable solvent, and
4) reacting the asphaltene carboxylic acid and alkyl amine mixture with polyaldehyde and hydroxylalkyl or hydroxylaryl aldehyde.

In exemplary embodiments, the protic asphaltene ionic liquids were prepared by extraction from bitumen, distilled bitumen, sludge, crude oil, shale oil, shale gas condensate, or coal. The extracted asphaltenes are oxidized in the presence of oxidizing agents to form asphaltene carboxylic acids. The oxidation reaction occurred at a temperature in the range of 10-90° C., such as about 10, 20, 30, 40, 50, 60, 70, 80 or 90° C. Suitable oxidizing agents include but are not limited to oxygen, ozone, hydrogen peroxide, fluorite dioxide, lithium peroxide, barium peroxide, fluorine, chlorine, nitric acid, nitrate compounds, sulfuric acid, peroxydisulfuric acid, peroxymonosulfuric acid, chlorite, chlorate, perchlorate, halogen compounds hypochlorite, hypohalite compounds, household bleach, hexavalent chromium compounds, chromic acids, dichromic acids, chromium trioxide, pyridinium chlorochromate, chromate compounds, dichromate compounds, permanganate compounds, potassium permanganate, sodium perborate, nitrous oxide, potassium nitrate, sodium bismuthate, or any combination thereof. Preferably the oxidizing agent is potassium permanganate or permanganate compounds.

In some aspects, the alkylamine is a C3-C30 alkyl amine such as but not limited to methylamine, dimethylamine, trimethylamine, ethylamine, propylamine, butylamine, pentylamine, hexylamine, heptylamine, octylamine, nonylamine, decanylamine or undecanylamine. The formation of the 1,3-dialkyl imidazolium cation in tandem with the asphaltene carboxylate require a polyaldehyde such as but not limited to glyoxal, paraformaldehyde, formaline, succinaldehyde, malealdehyde, glutaraldehyde, chloral, or furfural and a hydroxylalkyl or hydroxylaryl-aldehyde such as but not limited to p-hydroxyl benzaldehyde.

Suitable solvents for the preparation of the protic asphaltene ionic liquid include but are not limited to water and organic solvents, preferably water, toluene, hexane, benzene, chloroform or 1,4-dioxane, or mixtures of one or more of these. The reaction is carried at a temperature in the range of, for example, 30-110° C. such as 30, 40, 50, 60, 70, 80, 90, 100, 110° C. for e.g. 2-6 hrs such as 2, 2.5, 3, 3.5, 4, 4.5, 5, 5.5 or 6 hr.

In one embodiment, the protic asphaltenes described herein are thermal stable a temperature up to about 300° C. such as 10, 20, 30, 40, 50, 60, 70, 80, 90, 100, 110, 120, 130, 140, 150, 160, 170, 180, 190, 200, 210, 220, 230, 240, 250, 260, 270, 280, 290 or 300° C.

In one embodiment, the protic asphaltenes ionic liquid described herein have lower glass transition temperature ($T_g$) ranged from −70° C. to 30° C. such as −70° C. to −60° C., −60° C. to −50° C., −50 to −40° C., −40° C. to −30° C., −30° C. to −20° C., −20° C. to −10° C., −10° C. to 0° C., 0° C. to 10° C., 10° C. to 20° C. or 20° C. to 30° C.

In one embodiment, the protic asphaltenes ionic liquid described herein have a melting temperatures ($T_m$) in the range of 45° C. to 90° C. such as 45, 50, 55, 60, 65, 70, 75, 80, 85, 90° C.

In one embodiment, the protic asphaltene ionic liquids described herein in are particularly useful in the stabilization of asphaltenes in crude oil, bitumen, diesel fuel, petroleum fuel, biofuel, residual oil, fuel gas, flare gas, propane, butane, liquified petroleum gas, natural gas liquid and refinery fractions and combination thereof to prevent the aggregation and precipitation of asphaltenes. The protic asphaltenes ionic liquids stabilize asphaltenes in produced fluids recovered from the reservoir, in processed fluids, fluids stored in vessels as well as shipped fluids. The amount of asphaltenes deposits formed during the production, processing, storage or transit of the petroleum hydrocarbon fluid is significantly reduced when the petroleum hydrocarbon fluid is treated or is in contact with protic asphaltene ionic liquids. The amount of agglomerates or accumulates of asphaltenes deposits formed during the production, processing, storage or transit of the petroleum hydrocarbon fluid is significantly reduced when treated or is in contact with protic asphaltene ionic liquids. The amount of asphaltene precipitated from a petroleum hydrocarbon fluid during the production, processing, storage or transit of the petroleum hydrocarbon fluid is significantly reduced when treated or is in contact with protic asphaltene ionic liquids.

In one embodiment, the protic asphaltene ionic liquids are used as an asphaltene inhibitor of petroleum hydrocarbon fluids, processing of petroleum hydrocarbon fluids (including processing within a refinery), storage of the petroleum hydrocarbon fluids as well as during transit of the petroleum hydrocarbon fluids. The protic asphaltene protic ionic liquid effectively inhibits, reduces, prevents and/or controls the deposition, accumulation and/or agglomeration of asphaltene as well as in produced fluids, processed fluids, stored fluids and shipped fluids.

In one embodiment, the protic asphaltene ionic liquids stabilizes the petroleum fluid during production, processing, storage and transport by minimizing the formation or precipitation of asphaltenes. In addition, the asphaltene inhibitor composition minimizes precipitation of asphaltenes.

In one embodiment, the protic asphaltene ionic liquids may be introduced into the reservoir during a well treatment operation. In addition, to reducing, inhibiting or preventing the deposition, agglomeration or accumulation of asphaltene deposits in produced fluids, the composition minimizes formation and precipitation of deposits and agglomerates onto the surfaces of flow conduits and vessels and onto the borehole during production of the crude.

Typically, the composition is introduced into the reservoir during a drilling, completion or stimulation operation (including fracturing, acidizing, etc.). In an embodiment, the protic asphaltene ionic liquids may be prepared and then pumped into the reservoir. Alternatively, the protic asphaltene ionic liquids may be pumped into the reservoir simultaneously or during separate pumping stages.

In one embodiment, The injection of asphaltene ILs into crude oil ranged from 500 to 10000 mg·L$^{-1}$ such as 500, 1000, 1500, 2000, 2500, 3000, 3500, 4000, 4500, 5000, 5500, 6000, 6500, 7000, 7500, 8000, 8500, 9000, 9500 or 10000 mg·L$^{-1}$ to act as asphaltene dispersant.

Exemplary Preparation of the Protic Asphaltene Ionic Liquid

The invention provides the synthesis of a protic asphaltene ionic liquid by oxidation of alkyl chains on the periphery of asphaltenes to carboxylic group in the presence of at least one oxidizing agents such as $KMnO_4$ as illustrated in scheme 1. The hydrophobic asphaltene 1,3 dialkylimidazolium ILs is prepared by reacting an alkyl amine with a hydroxyl alkanal or hydroxyl benzaldehyde in the presence of polyaldehyde such as glyoxal and asphaltene carboxylic acid following the procedures described in examples 3 and 4 to form a protic asphaltene ionic liquid (Scheme 1).

Scheme 1. Synthesis of protic asphaltene ionic liquids.

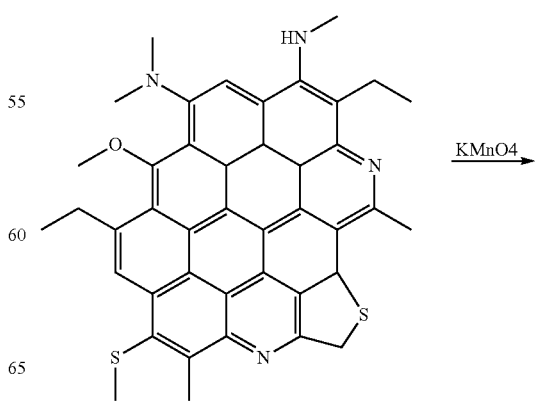

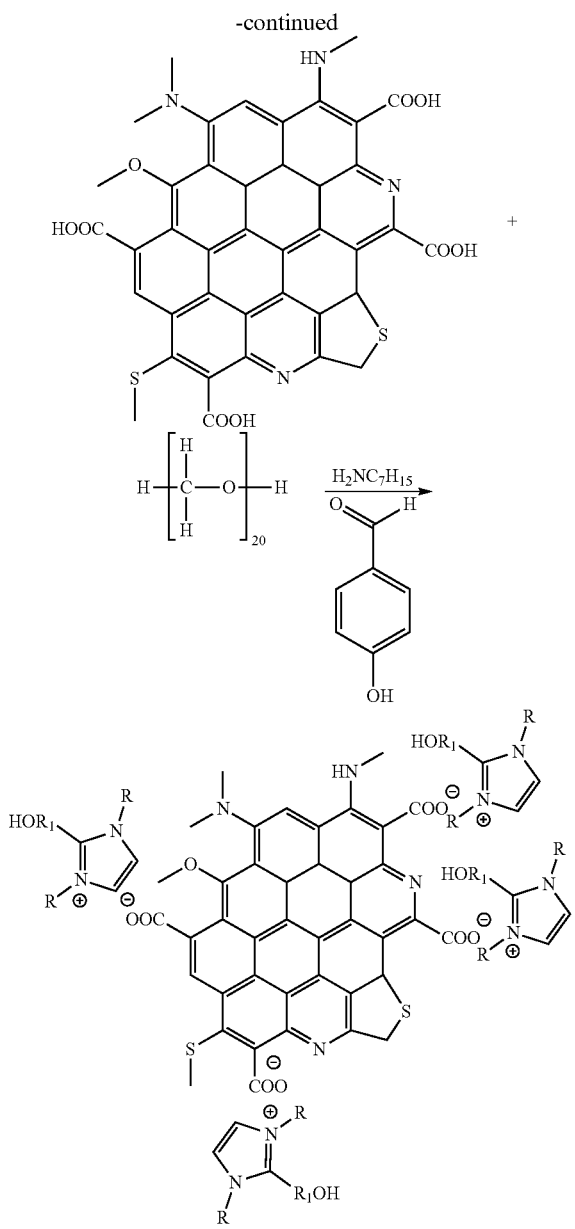

Characterization of Protic Asphaltenes Ionic Liquids

Figure 1C:
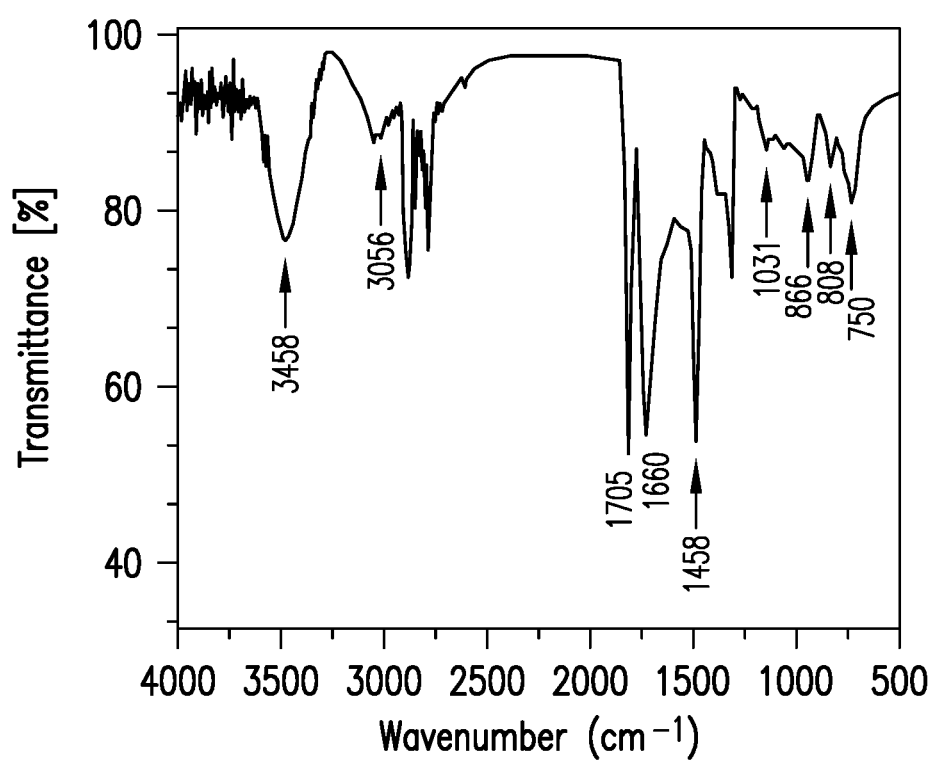

The chemical structures of the asphaltenes, and the structure of the synthesized asphaltene carboxylic acid and protic asphaltene ionic liquids were elucidated from FTIR spectra represented in FIG. 1a-e. It is observed from the FIG. 1b that the bands correspond to the carboxylic acid groups at 3500 and 1710 cm$^{-1}$ for OH and C=O stretching (FIG. 1 b and c) are not observed in the spectrum of asphaltenes (FIG. 1 a). Moreover, the intensity of bands at around 2980 and 2750 cm$^{-1}$ assigned to the stretching of the C—H aliphatic (FIG. 1a-e) were reduced more in asphaltene carboxylic prepared according the procedure of example 1 (FIG. 1b) than asphaltenes (FIG. 1a) and that prepared according the procedure of example 1 (FIG. 1c). Several peaks in the frequency range between 2800 and 3000 cm$^{-1}$ assigned to the symmetric and asymmetric stretching vibrations of methylene and methyl groups in the alkyl chain part for protic asphaltene ionic liquids (FIG. 1d-e) are observed.

Figure 1D:
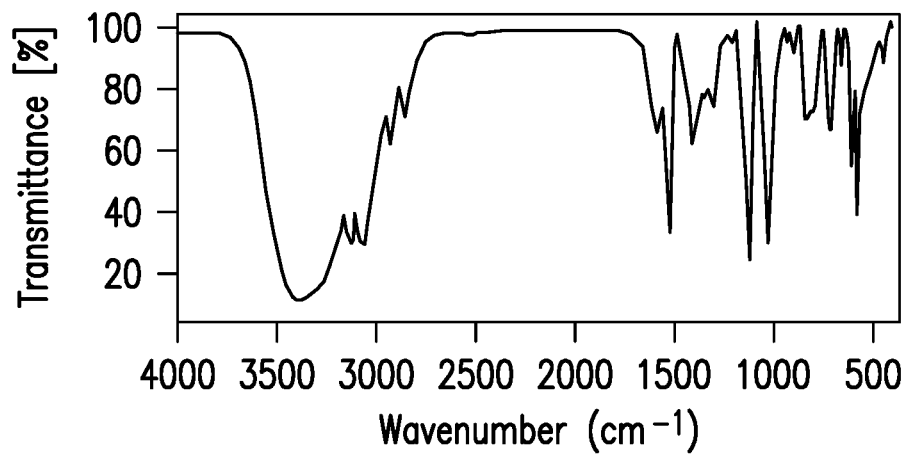
Figure 1E:
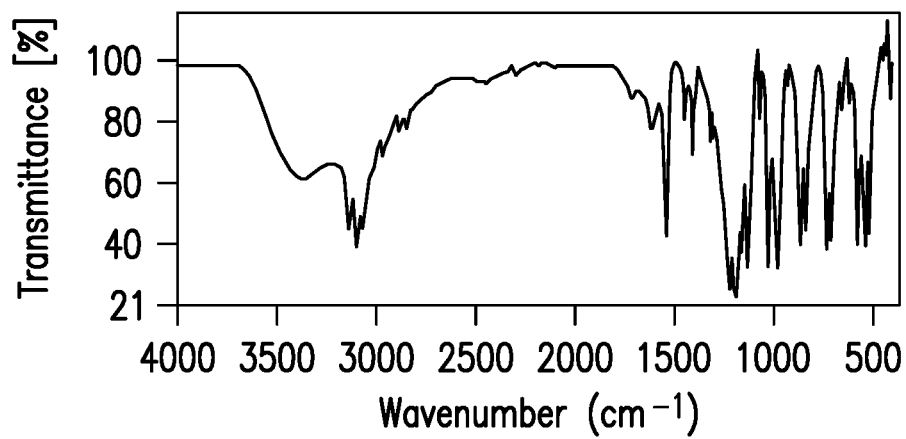
Figure 2A:
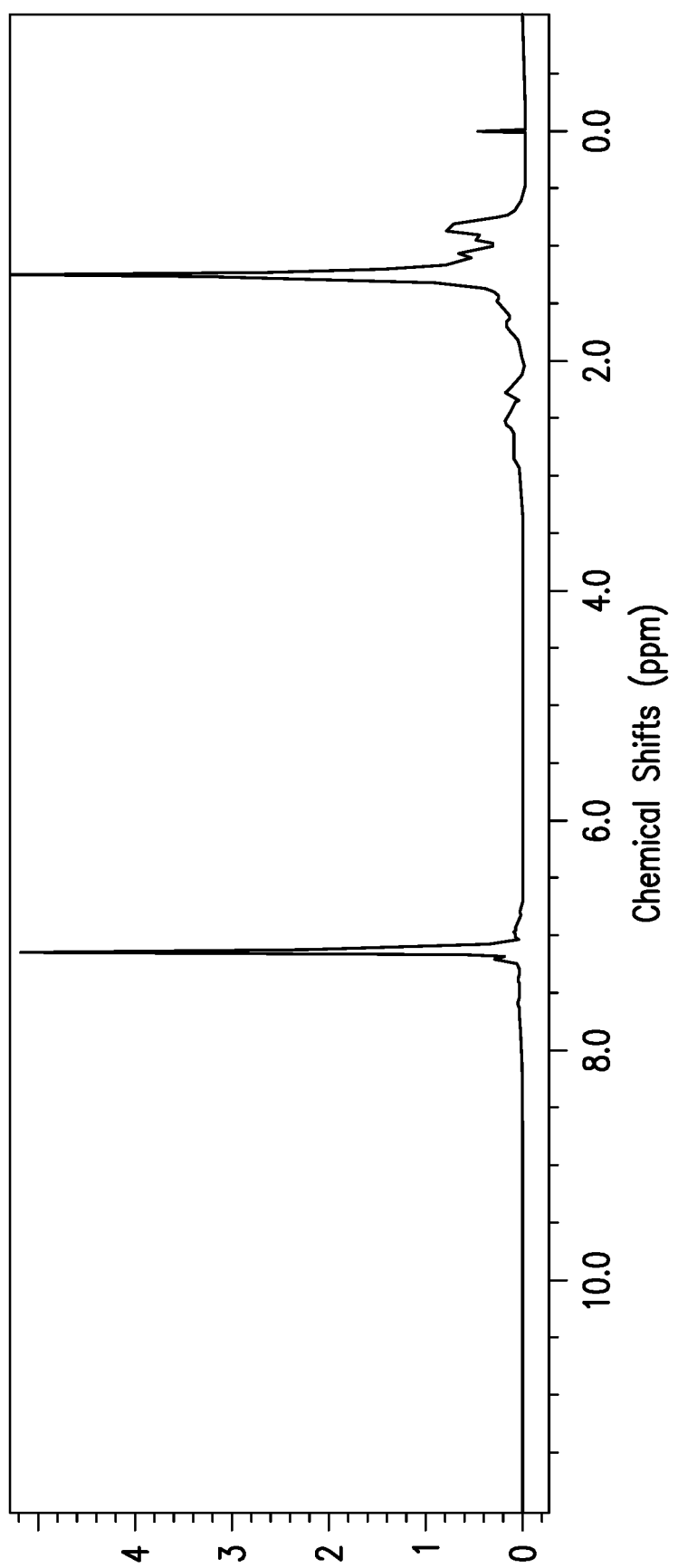
FIG. 2A-C. $^1$H NMR spectra of (A), asphaltenes, (B), protic asphaltenes ionic liquids prepared in example 3 and (C), protic asphaltenes ionic liquids prepared in example 4.
Figure 2B:
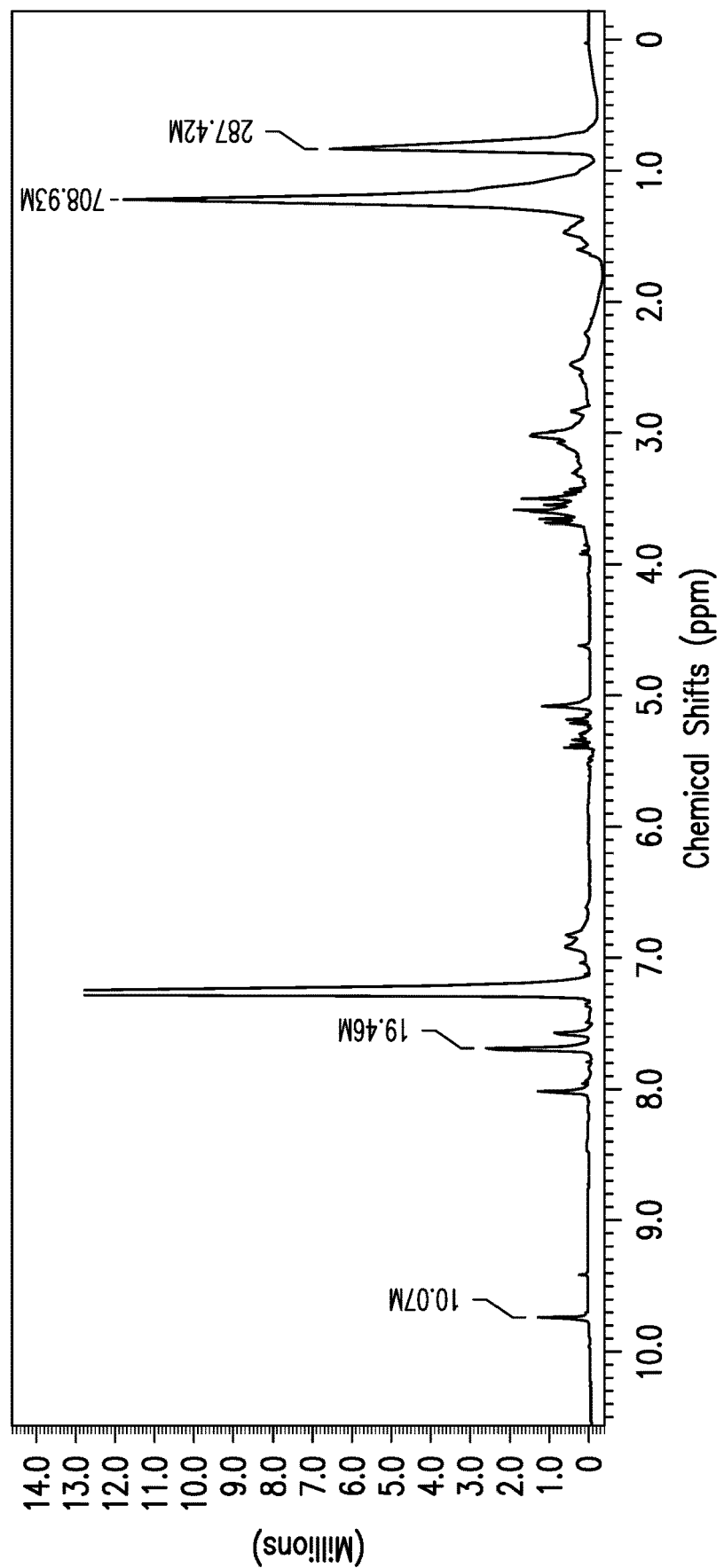
Figure 2C:
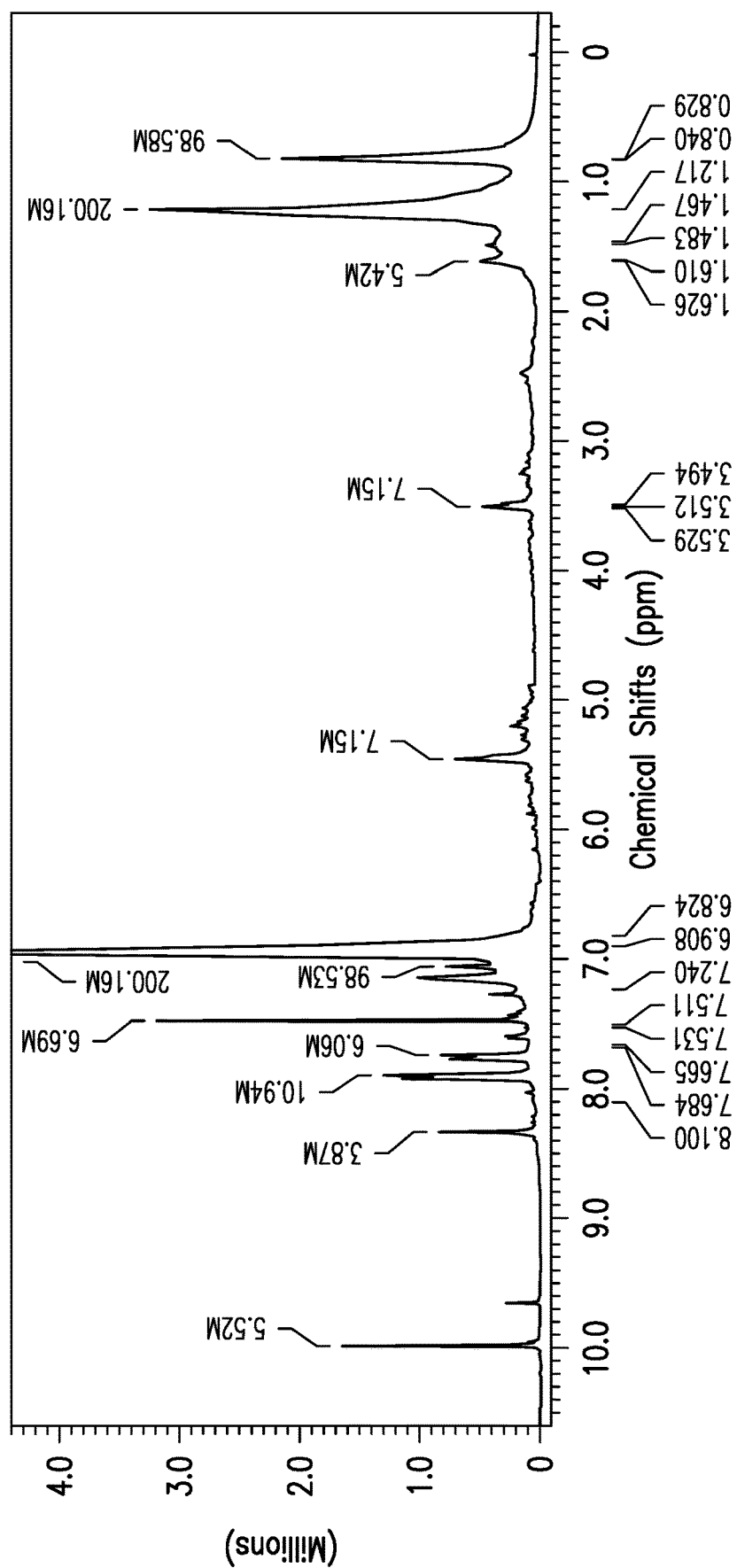

The FTIR spectra of protic asphaltene ionic liquids prepared cannot be used to determine the formation of ionic liquids due to overlap of their FTIR spectra in the regions 1700-500 cm$^{-1}$ (FIG. 1d-e). Consequently, $^{1}$HNMR spectra of protic asphaltene ionic liquids summarized in FIG. 2a-c were used to elucidate their chemical structures.

The chemical structure of an asphaltene can be confirmed from its $^{1}$HNMR spectrum (FIG. 2a) to elucidate that the asphaltenes contain a significant amount of paraffinic H atoms (CH$_3$, CH$_2$), relatively low amount of mono aromatic and polyaromatic H atoms (5%), and a negligible percentage of olefins. Moreover, the intensity of peaks at 1.2 ppm (S, CH$_2$ aliphatic protons), and 7.26 ppm (S, aromatic protons) of the prepared protic asphaltenes ionic liquids (FIG. 2b-c) indicated the decrease in the aliphatic hydrocarbon intensity more than aromatics intensity of asphaltenes. The appearance of peaks at 6.85-7.2 ppm indicated the presence of the substituted phenoxy group. It was also observed the appearance of the +N=CH protons from 9.3 to 10.3 (FIG. 2 b-c) due to effect of carboxylate asphaltene groups confirms the formation of imidazole ILs as represented in scheme 1.

Figure 3A:
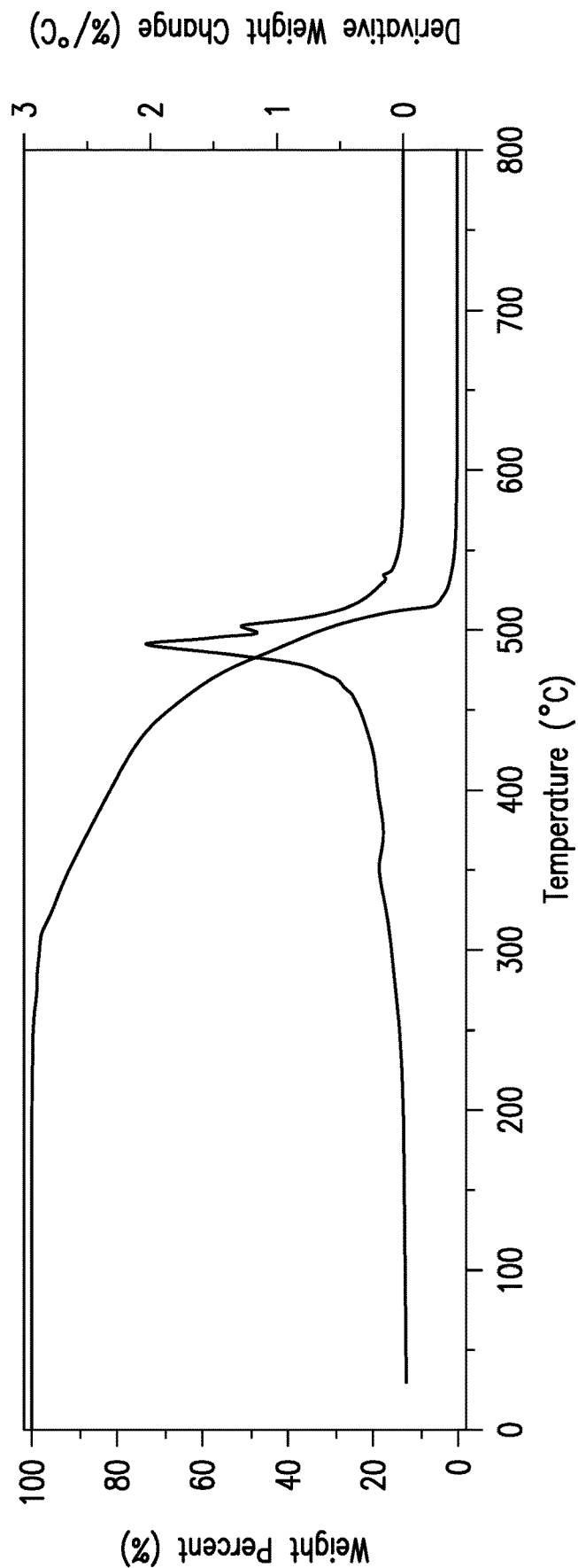
FIG. 3A-C. TGA and DTA thermograms of (A), asphaltenes, (B), protic asphaltenes ionic liquids prepared in example 3 and (C), protic asphaltenes ionic liquids prepared in example 4.
Figure 3B:
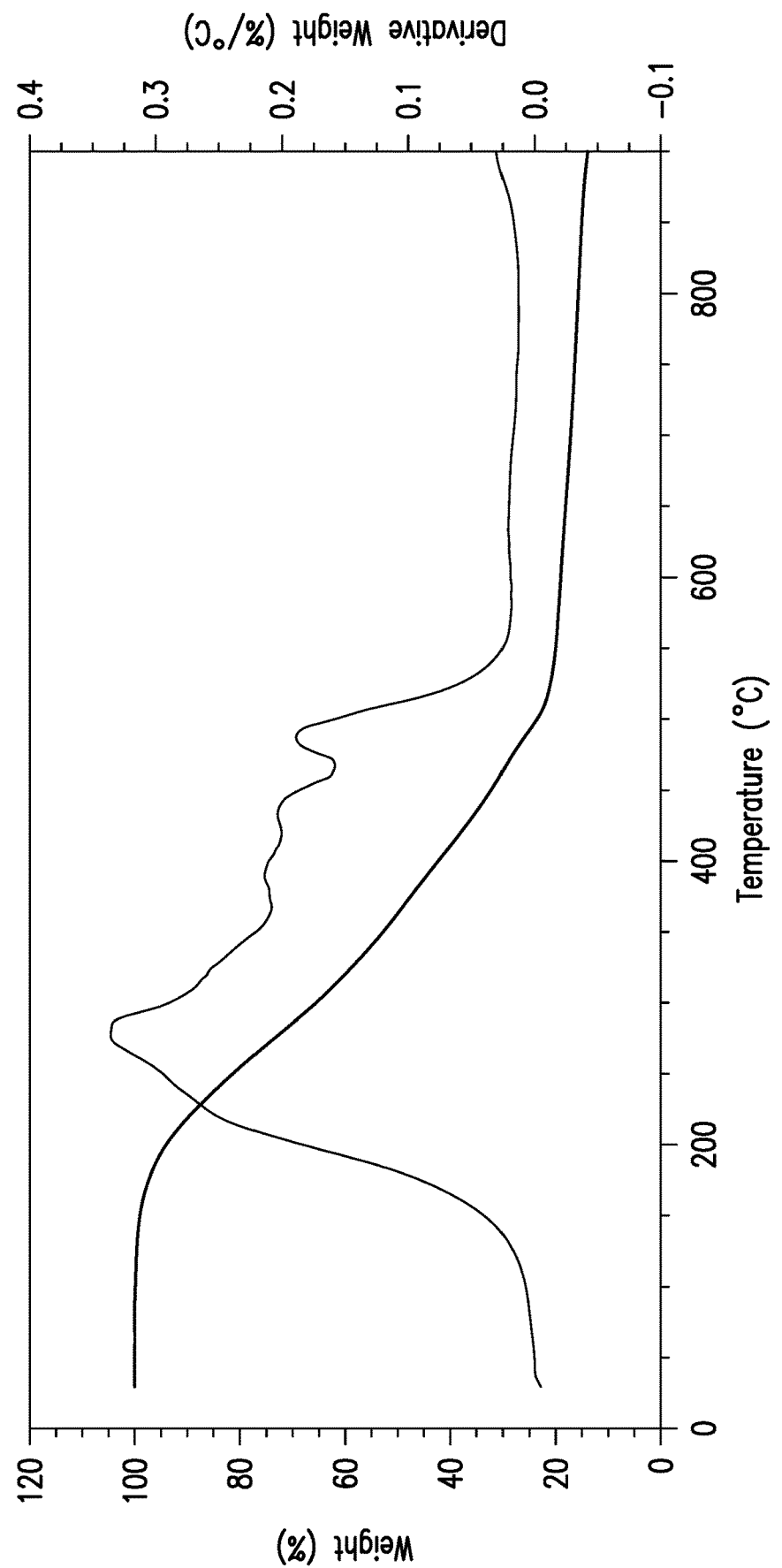
Figure 3C:
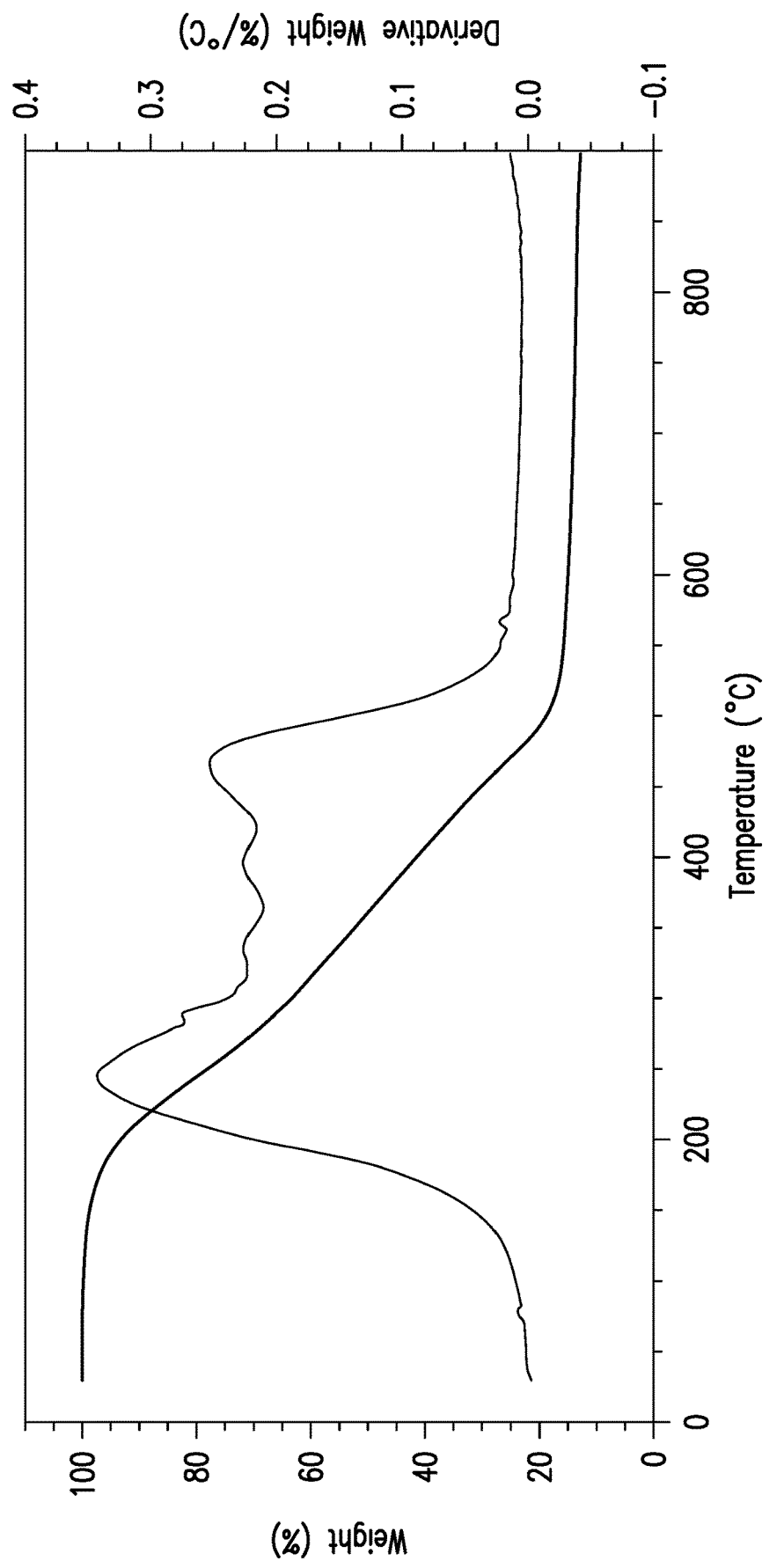

It is very important to study the thermal stability of the prepared protic asphaltene ionic liquids before application as oilfield chemicals because the petroleum industry usually required an expansion of operations at elevated temperatures. The thermal stability of asphaltenes and protic asphaltene ionic liquids prepared was examined by TGA and differential thermal analysis (DTA) thermograms are represented in FIG. 3a-c. As shown in FIG. 3a, asphaltenes exhibited degradation at 300° C., followed by a significant weight loss between 450° C. and 550° C., where the maximum weight loss was observed at 503° C., as indicated by the sharp peak in the DTA curve. The thermal stability of the prepared protic asphaltenes ionic liquids estimated from their thermograms (FIG. 3b-c). The data showed their degradation at temperature of 180-200° C. which referred to the presence of carboxylate groups. The low thermal stability of protic asphaltene ionic liquids based on imidazole cation and carboxylate anion is related to the degradation with formation of acetic acid that is produced from the deprotonation of the cation during the formation of the original base. The formation of acetic acid reduces the thermal stability of protic asphaltene ionic liquids. It was also observed that the presence of 15 and 22.3 wt % of residue of protic asphaltene ionic liquids after heating up to 800° C. (FIG. 3b-c) confirm the crosslinking of protic asphaltene ionic liquids at high temperature. The crosslinking of asphaltene ionic liquids indicated the formation of cyclic carbons and nitrogen links formed due to the degradation of methylene links of phenyl dialkyl imidazole as substituent.

Dispersion of Protic Asphaltenes ILs in Heptane:Toluene

Figure 4A:
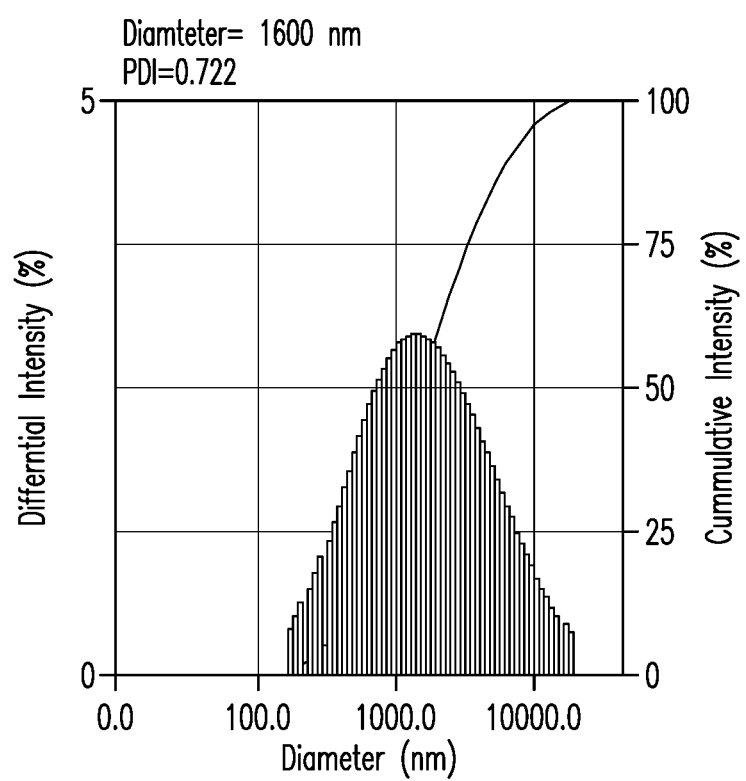
FIG. 4A-C. DLS data of (A), asphaltenes, (B), protic asphaltenes ionic liquids prepared in example 3 and (C), protic asphaltenes ionic liquids prepared in example 4 in different volume percentages of toluene:heptane solvent at 25° C.
Figure 4B:
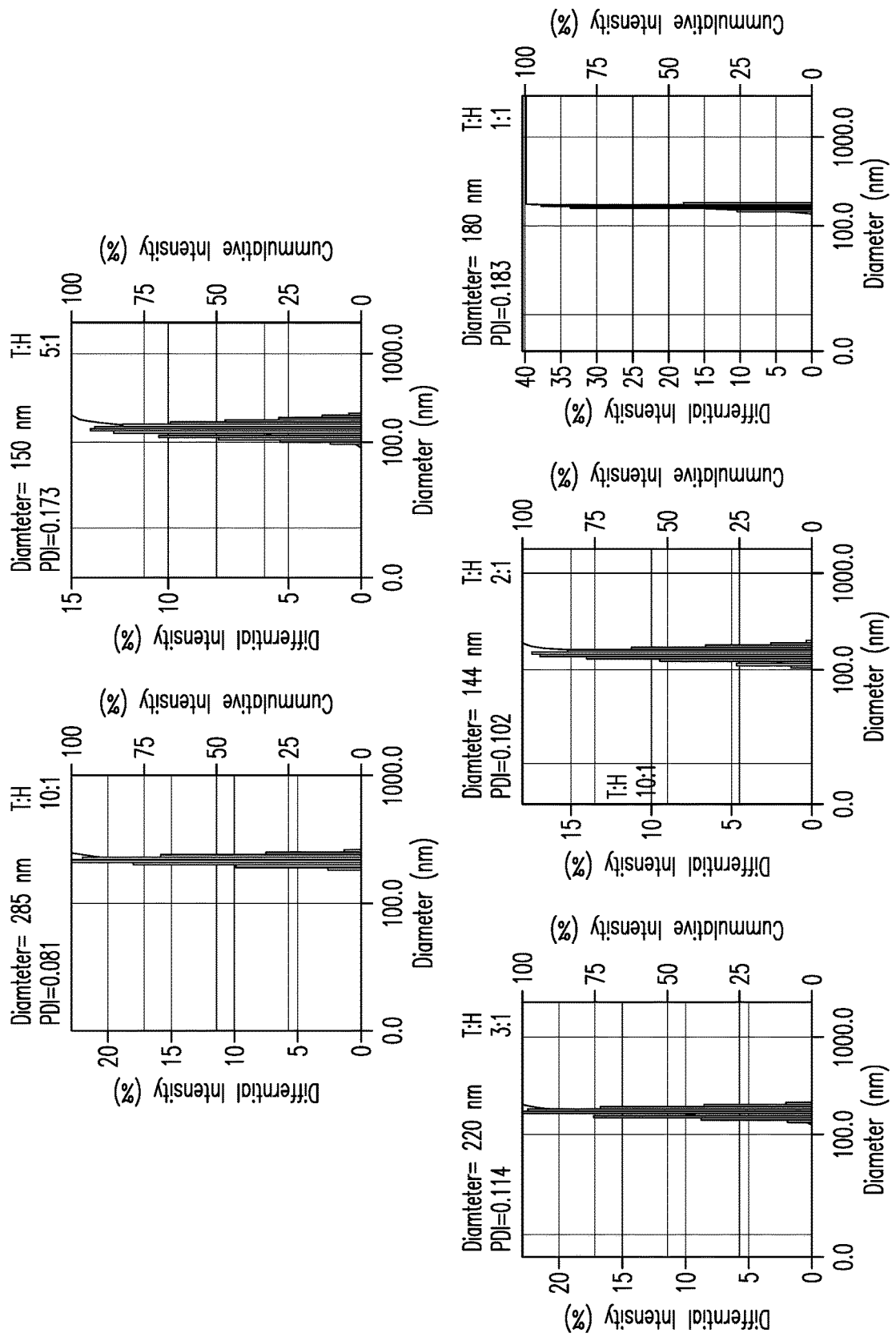
Figure 4C:
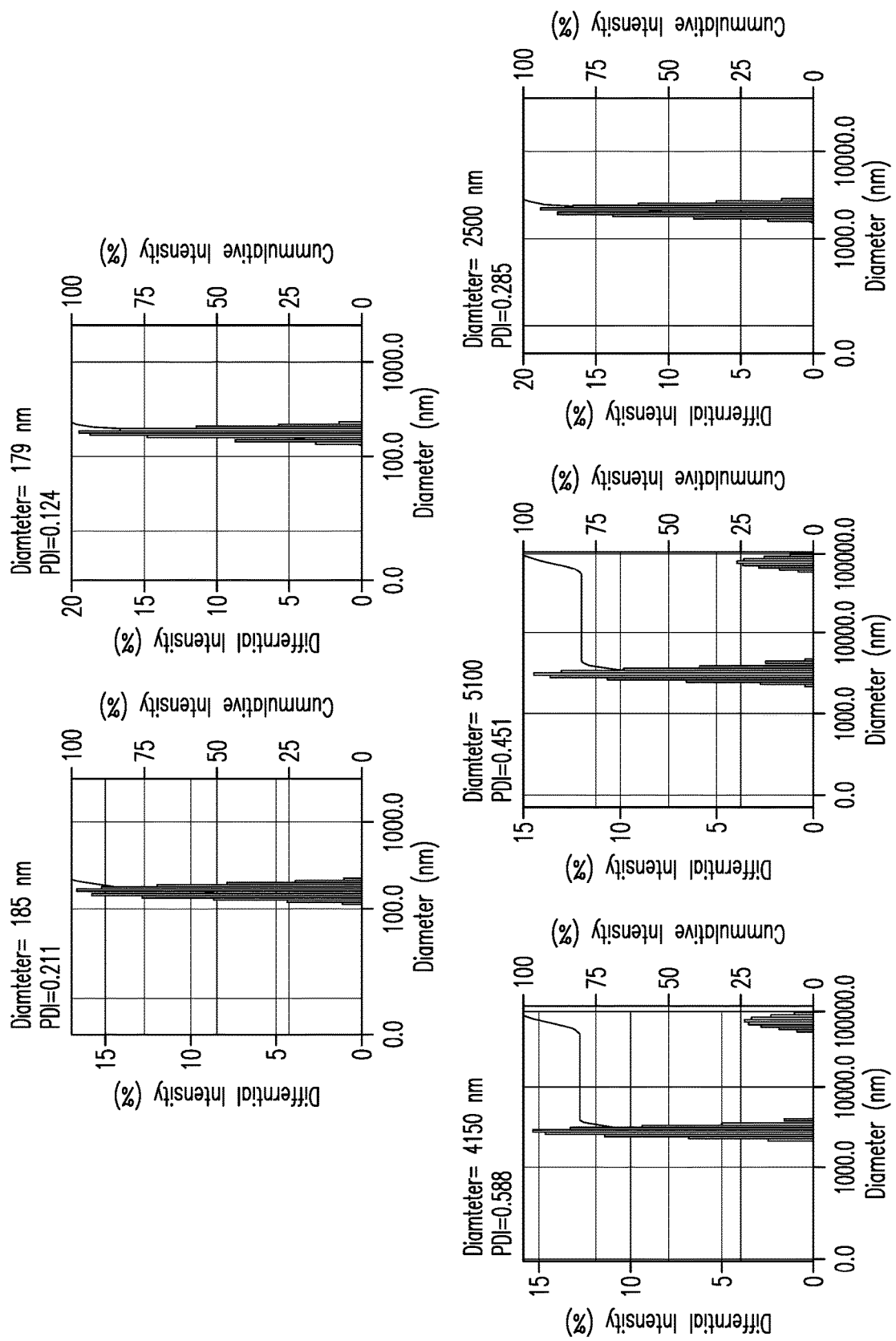

It was previously reported that different types of commercial ionic liquids used to separate asphaltenes or to upgrade the bitumen or heavy petroleum [18]. Moreover, different compositions of commercial products among of them ionic liquids were formulated to apply as asphaltenes dispersants [19]. In the present invention, protic asphaltene ionic liquids prepared herein are designed to act as asphaltene dispersants. This property of the protic asphaltene ionic liquids is due not only to the hydrophobic interactions between hydrophobic moieties of protic asphaltene ionic liquids and hydrophobic polynuclear aromatics of asphaltene but also to the charge transfers between charges on the prepared protic asphaltene ionic liquids and heteroatoms of asphaltene. In this respect, the carboxylate and phenoxy anions were also selected to investigate the effect of anion types on the electrostatic, columbic, interactions of protic asphaltene ionic liquids with asphaltene. To investigate the asphaltene dispersion efficiency, asphaltene particle size distribution was determined from DLS in the presence and absence of protic asphaltene ionic liquids in. In this respect, the asphaltene particle size diameter and the polydipersity index (PDI) were determined from DLS as represented in FIG. 4 a-c.

The data confirmed that the asphaltene aggregates sizes and their PDI increased with variations toluene:n-heptane (T:H) volume ratios. It was noticed that the decrease of n-heptane ratio to more than T:H (10:1) aggregates and precipitate the asphaltenes (FIG. 4a). Moreover, the order for reduction of asphaltene size aggregates increased with the presence of protic asphaltenes protic asphaltene ionic liquids prepared which indicates the formation of more imidazole ILs on the asphaltenes surfaces. These data confirm that the presence of carboxylate anion increases the interactions of imidazole protic asphaltene ionic liquids and asphaltenes with T:H co-solvents even at higher n-heptane volume ratio (1:1). The presence of phenyl groups in the chemical structure of imidazole protic asphaltenes protic asphaltene ionic liquids will increase π-π stacking between phenyl groups of imidazole and asphaltenes. It was also found that, the interaction between imidazole protic asphaltene ionic liquids and asphaltene depends on the orbital interactions (with interaction between the HOMO and LUMO orbitals), π-π interaction, hydrogen bond interaction and van der Waals forces observed among the alkyl groups.

Asphaltene Dispersion—Aggregation Inhibition Activity

Figure 5:
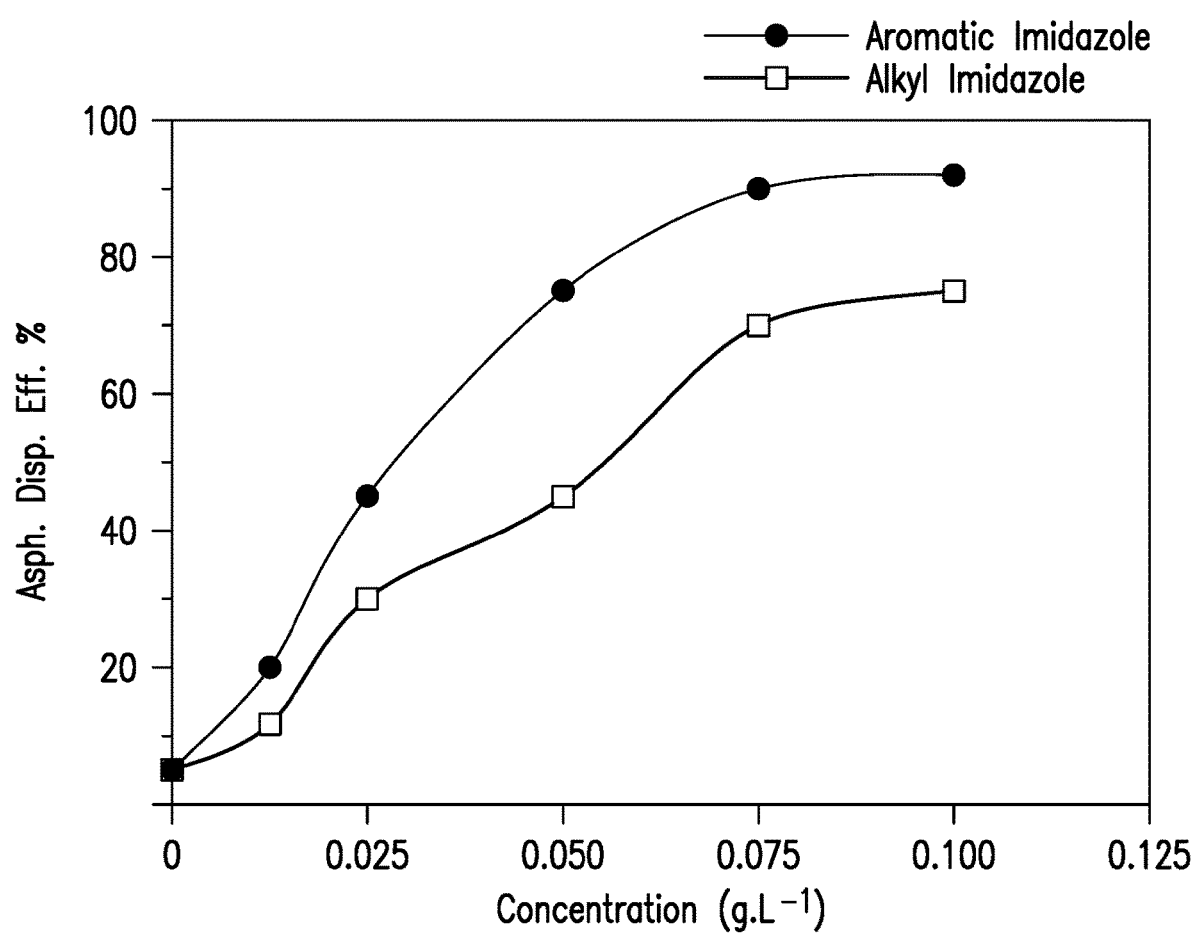
FIG. 5. Dispersion efficiencies of different ionic liquids (ILs) concentrations in toluene solutions for asphaltene in crude oil at 25° C.

The activity of the prepared protic asphaltene ionic liquids as asphaltene dispersants was determined using two techniques based on precipitation of asphaltene with n-heptane either in toluene or crude oil as represented in the experimental section. The contents of heavy crude oil used such as saturates, aromatic, resin and asphaltene contents are, 17.18, 30.85, 40.52 and 11.35 wt %. It has been reported that the crude oil with an asphaltene content of more than 10 wt. % formed aggregates due to entanglement of asphaltene in crude oil media [20] However, both asphaltene and resin, as components of crude oil, interacted together using different intermolecular forces between polar groups such as electrostatic interaction acid-base interaction, and hydrogen bonding or non-polar interactions such as Van der Waals force and π-π stacking to disperse in crude oil [21]. Based on these facts, the asphaltene dispersion efficiencies of the asphaltene in crude oil and in binary solvents based on toluene and n-heptane were determined in the absence and presence of crude oil and the results are presented in FIG. 5 and Table A. The relationship between protic asphaltenes ionic liquids, concentrations and asphaltene dispersion-aggregation inhibition efficiencies in crude oil is shown in FIG. 5. Careful inspection of data confirms that efficiencies grow rapidly for protic asphaltene ionic liquids having aromatic imidazole described herein and grow moderately for protic asphaltene ionic liquids having aliphatic alkyl imidazole. It can be observed that the protic asphaltene ionic liquids have efficiencies above 90% at 0.05 g L$^{-1}$. This data confirms that the charge-transfer interactions and the spatial arrangement of the protic asphaltene ionic liquids have more aromatics in the head of the molecule represented in scheme 2, assist in interactions with the plane structure of the asphaltene and resin of crude oil, and increase their dispersion in crude oil. The ionic liquids having alkyl imidazole of the protic asphaltenes ionic liquids inhibit the interaction of carboxylate and imidazole functional groups at the same time with asphaltene. The ability of ionic liquids to disperse asphaltene from toluene solution in the presence of n-heptane was evaluated at ionic liquid:asphaltene ranging from 1:1 to 1:4 (wt %) and listed in Table 1. The dispersion efficiency increased with increments of IL content such as determined for crude oil heptane (FIG. 5) but their values were lower than determined for crude oil. This data confirms that the ILs interact either with toluene or n-heptane and affected their activity as asphaltene dispersants, which increased in the presence of crude oil more than asphaltene alone. [22]

TABLE 1

Dispersion efficiencies of protic asphaltene ILs prepared by method 3 toluene solution for asphaltene in n-heptane at 25° C.

| Ratio of asphaltene | Efficiency (%) of ILs as asphaltene precipitation inhibitors | |
| --- | --- | --- |
| IL:Asphaltene | Alkyl imidazole | Aromatic imidazole |
| 1:4 | 10.23 | 25.16 |
| 1:3 | 19.63 | 38.01 |
| 1:2 | 25.36 | 42.33 |
| 1:1 | 30.54 | 60.29 |

It is to be understood that this invention is not limited to particular embodiments described herein above and below, and as such may, of course, vary. It is also to be understood that the terminology used herein is for the purpose of describing particular embodiments only, and is not intended to be limiting.

Where a range of values is provided, it is understood that each intervening value between the upper and lower limit of that range (to a tenth of the unit of the lower limit) is included in the range and encompassed within the invention, unless the context or description clearly dictates otherwise. In addition, smaller ranges between any two values in the range are encompassed, unless the context or description clearly indicates otherwise.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

EXAMPLES

Materials.

Bitumen Saudi Arabia was used as source of asphaltene and its properties are given in Table 1. Asphaltene was separated from petroleum crude oil sludge (50 g) by Soxhlet extraction with toluene (300 mL) followed by rotary evaporation to obtain toluene soluble organics (TSO) (bituminous like material) was determined. The remained solid toluene insoluble organics in the Soxhlet funnel (TIM) was re-extracted with 150 ml of tetrahydrofuran (THF) for 3 hr and THF was evaporated and the weight of heavy asphaltene fraction (HAs). The TSO was wetted with benzene or toluene and 100 ml of the alkane solvent (n-pentane or n-heptane) was added. The precipitated organics (insoluble) were filtered and dried 2 h at 105° C., as light asphaltene fractions. Toluene:n-heptane solvents (1:40 vol %) were used to isolate the asphaltene fractions from crude oil. Arabic heavy crude oil (19.2° API) and medium crude oil (30.8 API) were produced from Ras Gara Aramco, Saudi Arabia. Sea water collected from the Arabian Gulf.

TABLE 2

Asphalt properties and test method.

| Asphalt properties Crude source: Saudi Arabia | Value | Method According to the Chinese standard test method |
|---|---|---|
| Density @ 15° C./gcm$^{-3}$ | 1.034 | JTG 052 T0603-1993 ASTM D1188 |
| Penetration @ 2° C./0.1mm | 68.0 | JTJ 052 T0604-2000 ASTM D5 |
| Softening point (0° C.) | 48.5 | JTJ 052 T0606-2000 ASTM D36/D36M |
| Viscosity at 60° C./Pa s | 218.2 | JTJ 052 T0625-2000 ASTM D4402 |
| Ductility @ 15° C./cm | >150 | JTJ 052 T0624-1993 ASTM D113-17 |
| Flash point (° C.) | 328 | JTJ 052 T0611-1993 ASTM D3143 |
| Fraass brittle point (° C.) | −17.5 | JTJ 052 T0613-1993 STP1241 |
| Saturate, Aromatic, Resin and Asphaltene (SARA) fractions ASTM standard D2007-11 | | |
| Saturates (%) | 12.6 | |
| Aromatics (%) | 54.7 | JTJ 052 T0618-1993 |
| Resins (%) | 22.1 | |
| Asphaltenes (%) | 10.6 | |

Techniques.

The asphaltene dispersion-aggregation inhibition activity of different concentrations of the prepared ILs was examined using two methods of evaluations. The dispersion of asphaltene in binary solvents based on n-heptane as precipitant and toluene as solvent was investigated according reported method [23]. The remained asphaltene in toluene after precipitation with n-heptane was evaluated by ultraviolet-visible (UV-vis) spectroscopy at ambient temperature. The reference was prepared by mixing 1 mL of asphaltene solution (5.0 g L$^{-1}$ in toluene) with 9 mL of pure toluene. The ILs having concentrations of 0.0, 0.05, 2.5, 5.0, and 10.0 g L$^{-1}$ were blended to asphaltene toluene solutions. Heptane (8.8 mL) was added to reference sample and IL asphaltene blends. The absorbance of diluted supernatants was determined for reference (Ar) and for IL solutions (As) determined from UV-vis spectrometer at a selected wavelength of 390 nm. The efficiency (% Eff) of ILs as asphaltene dispersant was determined from the relation:

$$\% \text{ } Eff = [As \times 100/Ar] \quad (1)$$

The absorbance value depends on the concentration of asphaltenes in toluene solutions. The calibration curve was established and then used to measure the asphaltene concentration in toluene solutions at a wavelength of 346 nm.

The second route is based on blending of ILs with crude oil. The experiment was performed at different concentrations of ILs. The molarity ratio of IL-to-asphaltenes 1 and 3 was employed for each dispersion study of crude oil. The volume of n-heptane used to precipitate asphaltene in absence of ILs was added to separate asphaltenes from crude oil reference after they stirred at 500 rpm for 5 h. The resulting precipitate was separated after they centrifuged the solutions at 2000 rpm for 25 min. The absorbance of diluted solution in toluene was measured at 346 nm by using a UV-Vis spectrophotometer. The % Eff was determined as represented in equation 1.

The Fourier transform infrared (FTIR; Shimadzu FTIR 8000 spectrometer using KBr disc) instrument was used to confirm the formation of the protic asphaltene ILs.

The thermal stability and characteristics were evaluated using thermogravimetric analysis (TGA; Shimadzu DTG-60M) and conducted under nitrogen atmosphere at a heating rate of 10° C. per minute. Dynamic light scattering (DLS; Zetasizer Nano) was used to determine the particle size hydrodynamic diameter (nm) and polydispersity index (PDI) in toluene solution using at 25° C. Zeta potentials (mV) of ILs and asphaltenes were determined after dispersion of their ethanol solution in aqueous water contains 0.001 M NaNO$_2$ at 25° C.

The dispersion of asphaltene and adsorption of ILs on the asphaltenes was explored on glass slides using optical microscope (Olympus DP 72).

The absorbance of asphaltene in toluene solutions were recorded on a Perkin Elmer Lambda 35 UV-Vis spectrophotometer. The spectra were recorded at the wavelength range of 290 nm.

Example 1

Asphaltene flakes separated from bitumen, sludge and crude oil (1.00 g,) and concentrated sulfuric acid (25 mL, >95% w/w) were combined and stirred at 0° C. KMnO$_4$ (3 g) was added slowly under vigorous agitation, so that the temperature of the reaction mixture never exceeded 20° C. After this, the reaction mixture was heated at 30-80° C. for 30 minutes. Distilled water (50 mL) was then added and the solution stirred for a further 15 minutes at 60-110° C. The brown mixture was then diluted by addition of 175 mL of water followed by dropwise addition of 10 mL of 30% v/v hydrogen peroxide. The yellow-green mixture was filtered, washed with 150 mL of 10% aqueous HCl and allowed to dry. The dry powder was dispersed in 200 mL of distilled water via ultrasonication for 90 minutes. The dispersion was then centrifuged at 3000 rpm for 40 minutes and decanted to isolate the reaction products.

Example 2

Asphaltene flakes separated from bitumen, sludge and crude oil (400 mg, 33.3 mmol) were dispersed in 98% sulfuric acid (60 mL) at room temperature using a mechanical stirrer. After 10 min of stirring, 1 wt. equiv. of $KMnO_4$ (400 mg, 2.52 mmol) was added. The mixture became green due to the formation of the oxidizing agent $MnO_3$. Additional portions of $KMnO_4$ (400 mg, 2.52 mmol each) were added when the green color of $MnO_3$ was diminished, indicating that the oxidizing agent was consumed. A total of 4 wt. equiv. of $KMnO_4$ portions were sequentially added. The end of the oxidation was always determined by the disappearance of the green color after each $KMnO_4$ addition. The asphaltene samples of different oxidation levels were separated from the rest of the reaction mixture and used for characterization without any purification.

Example 3

Solution A of alkyl amines (C5-C22) such as heptyl amine (0.05 mol; 5.75 g) was mixed and dissolved with (0.05 mol; 6.1 g) of asphaltene carboxylic acid prepared by methods 1 and 2) in 50 mL of water. The solution B polyaldehyde such as paraformaldehyde, glyoxal, formaline (0.025 mol) and hydroxyalkyl- or hydroxyaryl-aldehyde such as p-hydroxy benzaldehyde (0.025 mol) was dissolved in 50 mL of water. Solution A added to solution B under vigorous stirring for 4 hrs at temperature ranged from 40–100° C. The solvent separated under vacuum for 24 hrs to afford the protic asphaltene ionic liquids.

Example 4

The method in example 3 repeated using toluene as solvent instead water. Solution A of alkyl amines (C5-C22) such as heptyl amine (0.05 mol; 5.75 g) was mixed and dissolved with (0.05 mol; 6.1 g) of asphaltene carboxylic acid prepared by methods 1 and 2) in 50 mL of toluene. The solution B polyaldehyde such as paraformaldehyde, glyoxal, formaline (0.025 mol) and hydroxyalkyl- or hydroxyaryl-aldehyde such as p-hydroxy benzaldehyde (0.025 mol) was dissolved in 50 mL of toluene. Solution A added to solution B under vigorous stirring for 4 hrs at temperature ranged from 40-100° C. The solvent separated under vacuum for 24 hrs to afford the protic asphaltene ionic liquids.

While the invention has been described in terms of its several exemplary embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

REFERENCES

[1] Ariza, E.; Chaves-Guerrero, A.; Molina V, D., Effect of Average Molecular Parameters of Asphaltenes on the Rheological Properties of Crude Oils from Colorado Oil Field. *Energy & Fuels* 2018, 32 (6), 6557-6564.

[2] Groenzin, H.; Mullins, O. C., Molecular Size and Structure of Asphaltenes from Various Sources. *Energy & Fuels* 2000, 14 (3), 677-684.

[3] Islam, M. R.; Hao, Y.; Wang, M.; Chen, C.-C., Prediction of Asphaltene Precipitation in Organic Solvents Via Cosmo-Sac. *Energy & Fuels* 2017, 31 (9), 8985-8996.

[4] Durand, E.; Clemancey, M.; Lancelin, J.-M.; Verstraete, J.; Espinat, D.; Quoineaud, A.-A., Aggregation States of Asphaltenes: Evidence of Two Chemical Behaviors by 1 h Diffusion-Ordered Spectroscopy Nuclear Magnetic Resonance. *The Journal of Physical Chemistry C* 2009, 113 (36), 16266-16276.

[5] Abedini, A.; Ashoori, S.; Torabi, F.; Saki, Y; Dinarvand, N., Mechanism of the Reversibility of Asphaltene Precipitation in Crude Oil. *Journal of Petroleum Science and Engineering* 2011, 78 (2), 316-320.

[6] Paridar, S.; Solaimany Nazar, A. R.; Karimi, Y, Experimental Evaluation of Asphaltene Dispersants Performance Using Dynamic Light Scattering. *Journal of Petroleum Science and Engineering* 2018, 163, 570-575.

[7] Bai, L.; Nie, Y; Li, Y.; Dong, H.; Zhang, X., Protic Ionic Liquids Extract Asphaltenes from Direct Coal Liquefaction Residue at Room Temperature. *Fuel Processing Technology* 2013, 108, 94-100.

[8] Hu, Y.-F.; Guo, T.-M., Effect of the Structures of Ionic Liquids and Alkylbenzene-Derived Amphiphiles on the Inhibition of Asphaltene Precipitation from Co2-Injected Reservoir Oils. *Langmuir* 2005, 21 (18), 8168-8174.

[9] Ogunlaj a, A. S.; Hosten, E.; Tshentu, Z. R., Dispersion of Asphaltenes in Petroleum with Ionic Liquids: Evaluation of Molecular Interactions in the Binary Mixture. *Industrial & Engineering Chemistry Research* 2014, 53 (48), 18390-18401.

[10] Boukherissa, M.; Mutelet, F.; Modarressi, A.; Dicko, A.; Dafri, D.; Rogalski, M., Ionic Liquids as Dispersants of Petroleum Asphaltenes. *Energy & Fuels* 2009, 23 (5), 2557-2564.

[11] Yakubov, M. R.; Gryaznov, P. I.; Yakubova, S. G.; Tazeeva, E. G.; Mironov, N. A.; Milordov, D. V, Structural-Group Composition and Properties of Heavy Oil Asphaltenes Modified with Sulfuric Acid. *Petroleum Science and Technology* 2016, 34 (22), 1805-1811.

[12] Jerome Panzer, R. P., N.J. Combination of Asphaltenes with Flow Improver Polymers to Improve the Flow Properties of High Boiling Fuel Oils. U.S. Pat. No. 4,074,978 (A), 1978.

[13] Pieter Marinus Willem Cornelisse, A. N. Method for Solubilising Asphaltenes in a Hydrocarbon Mixture. U.S. Pat. No. 7,122,113 B2, 2006.

[14] William K. Stephenson, S. M. K., Houston, both of Tex Asphaltene Dispersants Inhibitors. U.S. Pat. No. 5,021, 498, 1991.

[15] Daniel E. Bowen, I., Olathe, K S, US Asphaltenes-Based Polymer Nano-Composites. US 2012/0238669 A1, 2012.

[16] Armin C. Pitchford, B., Okla, Phillips Petroleum Company Asphaltene-Derived Surfactant Composition and Its Preparation. U.S. Pat. No. 3,646,120, 1972.

[17] Abdullah, M. M. S.; Al-Lohedan, H. A.; Atta, A. M., Novel Magnetic Iron Oxide Nanoparticles Coated with Sulfonated Asphaltene as Crude Oil Spill Collectors. *RSC Advances* 2016, 6 (64), 59242-59249.

[18] Siski, n M.; Francisco, M. A.; Billimoria, R. M. U.S. Pat. No. 8,734,639 B2, 2014.

[19] Weers, J.; Nguyen, H.; Jen¬Nings, D.; Chao, K-P. WO2019/113513 A1, 2019.

[20] Castro, L. V.; Vazquez, F., Fractionation and Characterization of Mexican Crude Oils. *Energy & Fuels* 2009, 23 (3), 1603-1609.

[21] Goual, L.; Sedghi, M., Role of Ion-Pair Interactions on Asphaltene Stabilization by Alkylbenzenesulfonic Acids. *Journal of Colloid and Interface Science* 2015, 440, 23-31.

[22] Murillo-Hernández, J. A.; Garcia-Cruz, I.; López-Ramirez, S.; Duran-Valencia, C.; Dominguez, J. M.; Aburto, J., Aggregation Behavior of Heavy Crude Oil—Ionic Liquids Solutions by Fluorescence Spectroscopy. *Energy & Fuels* 2009, 23 (9), 4584-4592.

[23] Atta, A. M.; Ezzat, A. O.; Abdullah, M. M.; Hashem, A. I., Effect of Different Families of Hydrophobic Anions of Imadazolium Ionic Liquids on Asphaltene Dispersants in Heavy Crude Oil. *Energy & Fuels* 2017, 31 (8), 8045-8053.

We claim:

1. A method of forming a protic asphaltene ionic liquid, comprising
oxidizing one or more asphaltenes, and
reacting the oxidized asphaltenes with one or more alkyl amines and a hydroxyalkyl aldehyde and/or a hydroxyaryl aldehyde in the presence of a polyaldehyde under conditions suitable for forming the protic asphaltene ionic liquid.

2. The method of claim 1, wherein the asphaltenes are separated from bitumen, sludge, crude oil, diesel fuel, petroleum fuel, biofuel, residual oil, fuel gas, flare gas, propane, butane, liquefied petroleum gas, natural gas liquid, or refinery fractions (including gas oils and light lubricating oils) and combinations thereof.

3. The method of claim 1, wherein the protic asphaltene ionic liquid comprises one or more organic salts.

4. The method of claim 3, wherein anions of the one or more organic salts comprise carboxylates, carbonates, alkyl carbonates, halides, hydroxyl, bicarbonates, alkoxides, hydroxycarbonates and combinations thereof.

5. The method of claim 3, wherein the one or more organic salts comprise 1,3-dialkyl imidazolium cations of formula:

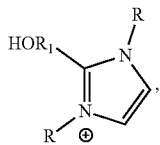

wherein R and R1 are independently selected from hydrogen, a straight or branched C1-30 alkyl group, benzyl, a C7-30 alkylbenzyl group, a C7-30 aryl alkyl group, a straight or branched C3-30 alkenyl group, a C1-30 hydroxyalkyl group, a C7-30 hydroxyalkylbenzyl group, an oxyalkylene or a polyoxyalkylene group or a zwitterion.

6. The method of claim 1, wherein said C1-C30 alkyl chains on the periphery of the asphaltenes are oxidized to carboxylic acid.

7. The method of claim 1, wherein the oxidizing agent is selected from the group consisting of potassium permanganate, permanganate compounds, hydrogen peroxide, lithium peroxide, barium peroxide, fluorine, chlorine, nitric acid, nitrate compounds, sulfuric acid, peroxydisulfuric acid, peroxymonosulfuric acid, chlorite, chlorate, perchlorate, halogen compounds hypochlorite, hypohalite compounds, household bleach, hexavalent chromium compounds, chromic acids, dichromic acids, chromium trioxide, pyridinium chlorochromate, chromate compounds, dichromate compounds, sodium perborate, nitrous oxide, potassium nitrate or sodium bismuthate.

8. The method of claim 1, wherein the one or more alkylamines has the formula: HNR1R2,
wherein R1 is independently selected from a hydrogen, a straight or branched C1-30 alkyl group, benzyl, a C7-30 alkylbenzyl group, a C7-30 aryl alkyl group, a straight or branched C3-30 alkenyl group, a C1-30 hydroxyalkyl group, a C7-30 hydroxyalkylbenzyl group, an oxyalkylene, and
wherein R2 is independently selected from a straight or branched C1-30 alkyl group, benzyl, a C7-30 alkylbenzyl group, a C7-30 aryl alkyl group, a straight or branched C3-30 alkenyl group, a C1-30 hydroxyalkyl group, a C7-30 hydroxyalkylbenzyl group, an oxyalkylene.

9. The method of claim 1, wherein the hydroxylalkyl or hydroxyaryl aldehyde has the formula: OHR1CHO,
wherein R1 is independently selected from a hydrogen, a straight or branched C1-30 alkyl group, benzyl, a C7-30 alkylbenzyl group, a C7-30 aryl alkyl group, a straight or branched C3-30 alkenyl group, a C1-30 hydroxyalkyl group, a C7-30 hydroxyalkylbenzyl group, an oxyalkylene.

10. The method of claim 1, wherein the conditions suitable for forming the protic asphaltene ionic liquid include performing the step of reacting at a temperature in the range of from 30° C. to 130° C.

11. The method of claim 1, wherein the protic asphaltene ionic liquid is soluble in organic solvents and in water.

12. The method of claim 1, wherein the protic asphaltene ionic liquid are thermal stable up to 300° C.

13. The method of claim 1, wherein the protic asphaltene ionic liquid exhibit a glass transition temperature ($T_g$) ranged from −70° C. to 30° C.

14. The method of claim 1, wherein the protic asphaltene ion a melting temperatures ($T_m$) in the range 45° C. to 90° C.

15. The method of claim 1, wherein the reacting of the protic asphaltene ionic liquid occurs in crude oil, bitumen, diesel fuel, petroleum fuel, biofuel, residual oil, and refinery fractions.

16. The method of claim 1, wherein the protic asphaltene ionic liquid is an asphaltene dispersant.

17. The method of claim 16, wherein the protic asphaltene ionic liquid inhibits asphaltene aggregation.

18. The method of claim 16, wherein the asphaltene is present in heavy crude oil.

19. A protic asphaltene ionic liquid made by the process of claim 1.

* * * * *

UNITED STATES PATENT AND TRADEMARK OFFICE
CERTIFICATE OF CORRECTION

PATENT NO. : 10,723,957 B1
APPLICATION NO. : 16/850356
DATED : July 28, 2020
INVENTOR(S) : Ismail et al.

Page 1 of 1

It is certified that error appears in the above-identified patent and that said Letters Patent is hereby corrected as shown below:

On the Title Page

Item [73], insert --King Abdulaziz University--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*